United States Patent [19]

Lawson et al.

[11] 4,235,453
[45] Nov. 25, 1980

[54] SPECIALLY FOLDED VEHICLE SAFETY BAG

[75] Inventors: Lawrence C. Lawson, Warren; Richard L. Cascadden, Rochester; Tsuneyo Ross, St. Clair Shores; Patrick T. Greene, Mt. Clemens, all of Mich.

[73] Assignee: Allied Chemical Corporation, Morris Township, Morris County, N.J.

[21] Appl. No.: 469,585

[22] Filed: May 13, 1974
(Under 37 CFR 1.47)

[51] Int. Cl.³ .............................................. B60R 21/08
[52] U.S. Cl. .................................................... 280/743
[58] Field of Search ....................................... 280/743

[56] References Cited
U.S. PATENT DOCUMENTS

| 3,690,695 | 9/1972 | Jones | 280/150 AB |
| 3,736,004 | 5/1973 | Haruna | 280/150 AB |
| 3,799,574 | 3/1974 | Bonn | 280/150 AB |

FOREIGN PATENT DOCUMENTS

896312  11/1953  Fed. Rep. of Germany .... 280/150 AB

*Primary Examiner*—John P. Silverstrim
*Attorney, Agent, or Firm*—Roger H. Criss; Robert A. Harman

[57] ABSTRACT

One embodiment of this invention is a specially folded steering wheel safety bag adapted to be mounted in a steering column of a vehicle to cushion the driver. Another embodiment is a specially folded passenger safety bag adapted to be mounted in the dashboard or in another area of the vehicle to cushion a passenger. Both the steering wheel safety bag and the passenger safety bag include: a plurality of adjacent first-pleats; a plurality of between-first-pleat-folds; and a plurality of cross-pleat-folds. Each first-pleat has a first-pleat-fold. One such between-first-pleat-fold is disposed between adjacent first-pleats. The cross-pleat-folds are disposed substantially transverse to the first-pleats, the first-pleat-folds and the between-first-pleat-folds. The steering wheel safety bag may have from six to twenty such first-pleats and from one to four such cross-pleat-folds. The passenger safety bag may have: from four to eight such first-pleats, from two to six second-pleats, from two to six first-cross-pleats, and from two to six second-cross-pleats.

2 Claims, 46 Drawing Figures

SPECIALLY FOLDED VEHICLE SAFETY BAG

BACKGROUND OF THE INVENTION

This invention relates to a safety bag adapted to be inflated in a vehicle in order to act as a cushion to protect an occupant of the vehicle in the event of an emergency situation, such as collision. More particularly, this invention relates to a vehicle safety bag which has been specially folded to reduce the impact of the bag upon the occupant during inflation and deployment of the bag. Still more particularly, this invention relates to a vehicle safety bag adapted for the driver and a vehicle safety bag adapted for the passenger, both safety bags having reduced impact upon the occupant, driver or passenger.

Safety bags are used in vehicle, such as automobiles, to protect the occupant of the vehicle during emergency situations, such as collision. In its deflated, folded condition, the safety bag may be disposed in the steering column, in the dashboard, or in other locations within the passenger compartment of the vehicle. In an emergency situation, such as collision or overturn, when the occupant is suddenly thrown forward, the safety bags are adapted to be inflated and deployed by a gas to cushion the occupant, thereby reducing the possibility of injury to the occupant.

It is desirable to soften or cushion the contact of the safety bag upon the occupant, including the driver, when the bag is inflated and deployed. It is especially desirable in situations where the occupant is a young child who is standing between the right front passenger seat and the dashboard of the automobile, the "standing child". The standing child will be contacted by the deploying bag sooner than a normally seated occupant of the right front passenger seat because the standing child is closer to the right front passenger (RFP) bag.

Among the prior art folding techniques which have been used with vehicle safety bags are the "bubble roll" and the "accordion fold". A prior art folding technique known as Origami folding is an ancient Oriental art of paper folding which is not known to have been used heretofore in connection with folding vehicle safety bags.

While some of the inflatable safety bags of the prior art have pleats when the bag is in deflated, folded condition, in the prior art the pleats are adjacent and parallel to one another. For exmple, U.S. Pat. No. 3,797,855 to Wright discloses an inflatable safety bag having a series of pleats fastened by breakable bindings to a mounting. U.S. Pat. No. 3,748,477 to Wulbrecht discloses a safety bag having a plurality of folded layers in a rolled configuration which form a transitory bubble upon inflation. Other U.S. Pat. Nos. disclosing inflatable safety bags having adjacent and parallel pleats are: 3,706,462 to Lilly; 3,632,136 to Foltz; and 3,473,824 to Carey et al. None of the prior art folding techniques disclose a specially folded vehicle safety bag, either for the driver or for the passenger, which exhibits the property of reduced impact on the occupant.

SUMMARY OF THE INVENTION

The safety bag of this invention is adapted to be inflated in a vehicle in order to protect an occupant of the vehicle, including both the driver and passengers, during an emergency situation, such as a collision. One embodiment of this invention is a specially folded steering wheel safety bag adapted to be mounted in the steering column of a vehicle to cushion the driver. The other embodiment of this invention is a specially folded passenger safety bag adapted to be mounted in the dashboard of the vehicle or in another area of the vehicle to cushion a passenger, such as a passenger occupying the right front passenger seat or a passenger occupying the rear seat of an automobile. Both embodiments of the vehicle safety bag of this invention exhibit superior deployment properties with reduced impact on the occupant.

Both the steering wheel safety bag and the passenger safety bag, when in the deflated, folded condition; include: a plurality of adjacent first-pleats; a plurality of between-first-pleat-folds; and a plurality of cross-pleat-folds. Each first-pleat has a first-pleat-fold. One such between-first-pleat-fold is disposed between adjacent first-pleats. The cross-pleat-folds are disposed substantially transverse to the first-pleats, the first-pleat-folds and the between-first-pleat-folds.

The steering wheel safety bag has a substantially circular outer circumference and an approximate center when in deflated, flattened, unfolded condition. The first-pleat-folds and the between-first-pleat-folds of the steering wheel safety bag are each disposed on a line radiating from the approximate center of the steering wheel safety bag. The steering wheel safety bag may have from six to twenty such first-pleats; from six to twenty such first-pleat-folds; from four to eighteen such between-first-pleat-folds; and from one to four such cross-pleat-folds.

The passenger safety bag has a first side, a second side, a third side, and a fourth side; when in deflated, flattened, unfolded condition. The first and second sides are substantially parallel to one another. The third and fourth sides are substantially parallel to one another and substantially perpendicular to the first and second sides. Thus, the passenger safety bag has a substantially rectangular or square configuration when in deflated, flattened, unfolded condition. The first-pleats, first-pleat-folds, and between-first-pleat-folds of the passenger safety bags are disposed substantially parallel to one another and adjacent and substantially parallel to the first side.

The passenger safety bag has a plurality of second-pleats, each second-pleat having a second-pleat-fold. There are a plurality of between-second-pleat-folds, one between-second-pleat-fold disposed between adjacent second-pleats. The second-pleat-folds and the between-second-pleat-folds are disposed substantially parallel to one another and adjacent and substantially parallel to the second side. The plurality of cross-pleat-folds includes a plurality of first-cross-pleat-folds and a plurality of second-cross-pleat-folds, each being arranged approximately transverse and approximately perpendicular to the first-pleats and the second-pleats. The plurality of first-cross-pleats are disposed adjacent and substantially parallel to the third side of the passenger safety bag. The plurality of second-cross-pleat-folds are disposed adjacent and substantially parallel to the fourth side of the passenger safety bag. The passenger safety bag may have: from four to eight such first-pleats; from two to six such second-pleats; from two to six such first-cross-pleats; and from two to six such second-cross-pleats.

Because of the special folding, both the steering wheel and the passenger safety bags of this invention exhibit superior deployment characteristics particularly with reference to the contact of the safety bag on the occupant of the vehicle, either driver or passenger. When in deflated, folded condition, both safety bags also provide a compact package adapted for convenient storage in a small space within the vehicle.

DETAILED DESCRIPTION

The safety bag of this invention is specially folded and adapted to be inflated in a vehicle in order to cushion an occupant of the vehicle, such as an automobile, during an emergency situation, such as collision. Two separate embodiments of the safety bag of this invention will be described. One embodiment is a specially folded steering wheel bag 52, shown in FIGS. 1-29, adapted to be mounted in the steering column of such an automobile to cushion the driver. The other embodiment is a specially folded passenger bag 100, shown in FIGS. 30-46, adapted to be mounted in the dashboard of the vehicle or in another area of the vehicle to cushion a passenger, such as a passenger occupying the right front passenger seat or a passenger occupying the rear seat of an automobile. The passenger may also be a child standing on the floor of the automobile in front of the right front passenger seat or in front of the rear seat.

Both the steering wheel bag 52 and the passenger bag 100 have a deflated, folded condition; and an inflated, unfolded condition. The safety bag is in a deflated, folded condition when it is stored in the vehicle prior to actuation. The bag is in an inflated, unfolded condition after it has been actuated and deployed to cushion an occupant of the vehicle. Soon after deployment, the safety bag begins to deflate.

When the bag is in deflated, folded condition, the bag includes a plurality of folds and pleats which are arranged to improve the deployment characteristics of the bag and reduce the impact of the bag upon the occupant, either passenger or driver. Both the steering wheel safety bag 52 and the passenger bag 100 include: a plurality of adjacent first-pleats; a plurality of between-first-pleat-folds; and a plurality of cross-pleat-folds. Each first-pleat has a first-pleat-fold. One such between-first-pleat-fold is disposed between adjacent first-pleats. The cross-pleat-folds are disposed substantially transverse to the first-pleats, the first-pleat-folds and the between-first-pleat-folds. The foregoing pleats and folds will be explained separately in reference to the steering wheel safety bag 52 and in reference to the passenger safety bag 100.

STEERING WHEEL SAFETY BAG

Figure 1:
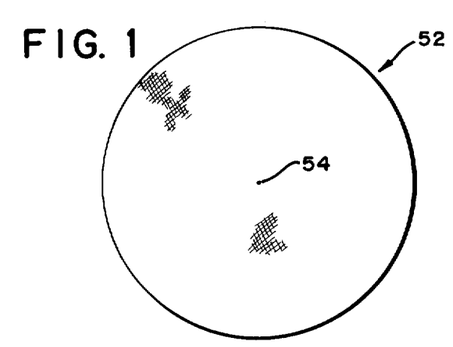
FIG. 1 is a schematic illustration of a steering wheel safety bag in deflated, flattened, unfolded condition.

Referring to FIG. 1, the steering wheel safety bag, referred to generally by the numeral 52, has a substantially circular outer circumference and an approximate center 54 when in deflated, flattened, unfolded condition. A typical steering wheel bag 52 in such condition has a diameter of approximately 28 inches. The means for connecting the steering wheel safety bag 52 to an inflation device (not shown) may be located at the approximate center 54.

Figures 20, 21, 22, 23, 26, 27:
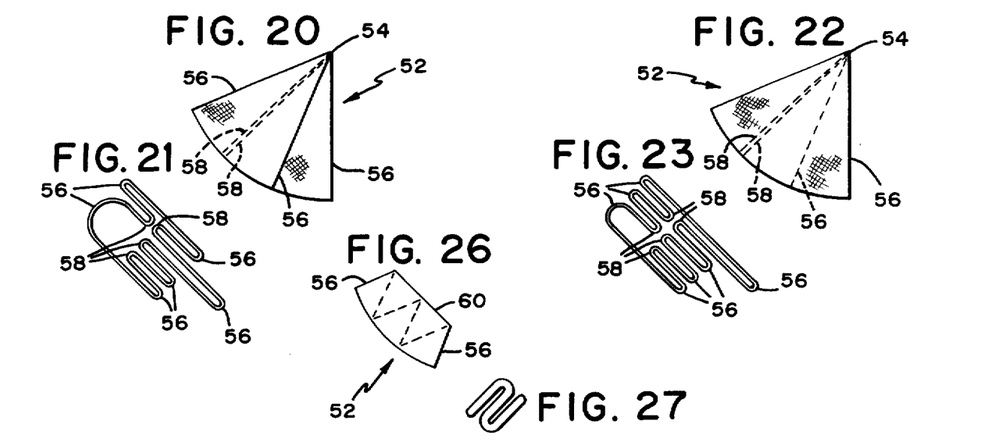
FIG. 26 is a schematic illustration of the steering wheel safety bag of this invention in its final storage configuration prior to inflation of the bag.
FIG. 27 is a cross-sectional view of FIG. 26.
Figures 24, 25, 28:
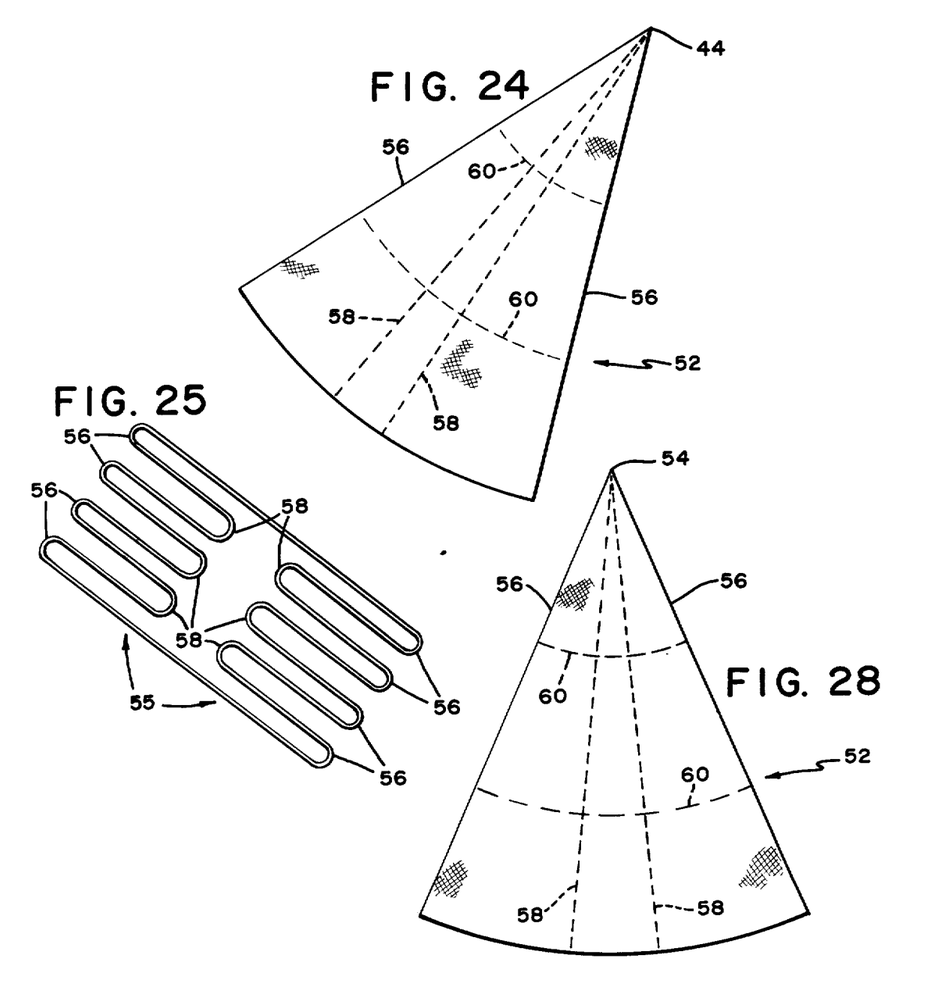
FIG. 24 is an enlarged illustration of a primary embodiment of the steering wheel safety bag of FIG. 1 immediately prior to its final storage configuration.
FIG. 25 is a cross-sectional view of FIG. 24.
FIG. 28 is an enlarged illustration of a secondary embodiment of the steering wheel safety bag of FIG. 1 immediately prior to the final storage configuration shown in FIG. 26.
Figure 29:
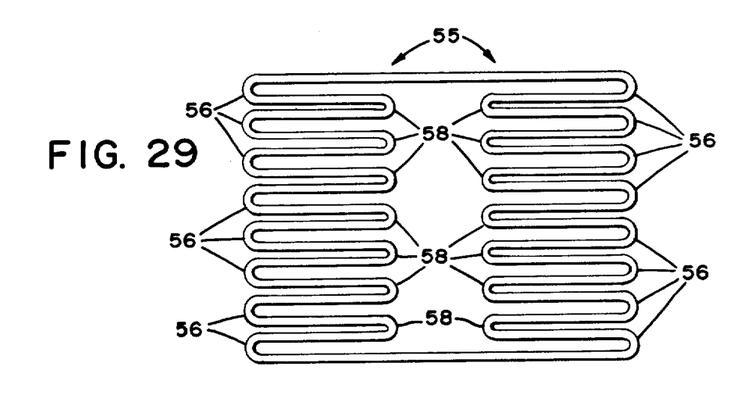
FIG. 29 is a cross-sectional view of FIG. 28.

FIGS. 2–27 illustrate a method in sequential steps to fold the steering wheel bag 52 into a final storage configuration which is illustrated in FIGS. 26 and 27. Referring to FIGS. 26 and 27, the steering wheel bag 52 after folding, is compact enough to be positioned within the steering wheel of an automobile. FIGS. 24 and 25 illustrates a primary embodiment of the steering wheel bag 52 immediately prior to the final storage configuration shown in FIGS. 26 and 27. FIGS. 28 and 29 illustrate an alternate and secondary embodiment of the steering wheel bag 52, immediately prior to the final storage configuration shown in FIGS. 26 and 27.

Referring to FIGS. 24 and 25, the steering wheel bag 52 has a plurality of first-pleats, referred to generally by the numeral 55; a plurality of first-pleat-folds 56; and a plurality of between-first-pleat-folds 58. Referring to FIGS. 24–27, the steering wheel bag 52 also has a plurality of cross-pleat-folds 60. Each first-pleat 55 has a first-pleat-fold 56. One between-first-pleat-fold 58 is disposed adjacent first-pleats. Each first-pleat-fold 56 and an adjacent between-first-pleat-fold 58 form a first-pleat.

The primary embodiment of the steering wheel bag 52 has from six to twelve such first-pleats 55; from six to twelve such first-pleat-folds 56; from four to ten such between-first-pleat-folds 58; and from one to four such cross-pleat-folds 60. Preferably, the primary embodiment of the steering wheel bag 52 has eight such first-pleats 55; eight such first-pleat-folds 56; and six such between-first-pleat-folds 58; and two such cross-pleat-folds 60, as illustrated in FIGS. 24–27.

Referring to FIGS. 24 and 25, the first-pleat-folds 56 and the between-first-pleat-folds 58 are each disposed on a line radiating from the approximate center 54 of the bag 52. The first-pleat-folds 56 and the between-first-pleat-folds 58 converge at one end of the first-pleats, the end corresponding to the approximate center 54 of the steering wheel safety bag 52. The first-pleat-folds 56 and the between-first-pleat-folds 58 diverge at the opposite end of the first-pleats, thereby forming a pie-shaped configuration.

Referring to FIGS. 24–27, the cross-pleat-folds 60 are disposed substantially transverse to the first-pleat-folds 56 and the between-first-pleat-folds 58. The cross-pleat-folds 60 bring the steering wheel bag 52 from the configuration shown in FIGS. 24–25 to the configuration shown in FIGS. 26–27.

FIGS. 28 and 29 illustrate a secondary embodiment of the steering wheel bag 52 immediately prior to the final storage configuration shown in FIGS. 26–27. Referring to FIGS. 26–29, the secondary embodiment of the steering wheel bag 52 has from fourteen to twenty such first-pleats, referred to generally by the numeral 55; from fourteen to twenty such first-pleat-folds 56; from twelve to eighteen such between-first-pleat-folds 58; and from one to four such cross-pleat-folds 60. Preferably, the secondary embodiment of the steering wheel bag 52 has sixteen such first-pleats 55; sixteen such first-pleat-folds 56; fourteen such between-first-pleat-folds 58; and two such cross-pleat-folds 60. Referring to FIGS. 26–29, the cross-pleat-folds 60 of the secondary embodiment of the steering wheel bag 52 are also disposed substantially transverse to the first-pleat-folds 56 and the between-first-pleat-folds 58. Such cross-pleat-folds 60 bring the secondary embodiment of the steering wheel bag 52 from its configuration shown in FIGS. 28–29 to its configuration shown in FIGS. 26–27.

Referring to FIGS. 28–29, the first-pleat-folds 56 and the between-first-pleat-folds 58 of the secondary embodiment are also disposed on a line radiating from the approximate center 54 of the bag 52. The first-pleat-folds 56 and the between-first-pleat-folds 58 converge at one end of the first-pleats, the end corresponding to the approximate center 54 of the bag 52. The first-pleat-folds 56 and the between-first-pleat-folds 58 diverge at the opposite end of the first-pleats, thereby forming a pie-shaped configuration.

Figure 2:
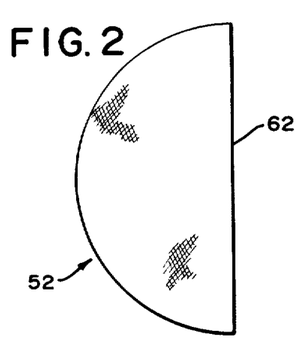
FIGS. 2, 4, 6, 8, 10, 12, 14, 16, 18, 20 and 22 are schematic illustrations of the steering wheel safety bag of FIG. 1 in intermediate configurations showing steps in folding the steering wheel safety bag of FIG. 1.
Figures 3, 4, 5, 6, 7, 8, 9, 10, 11:
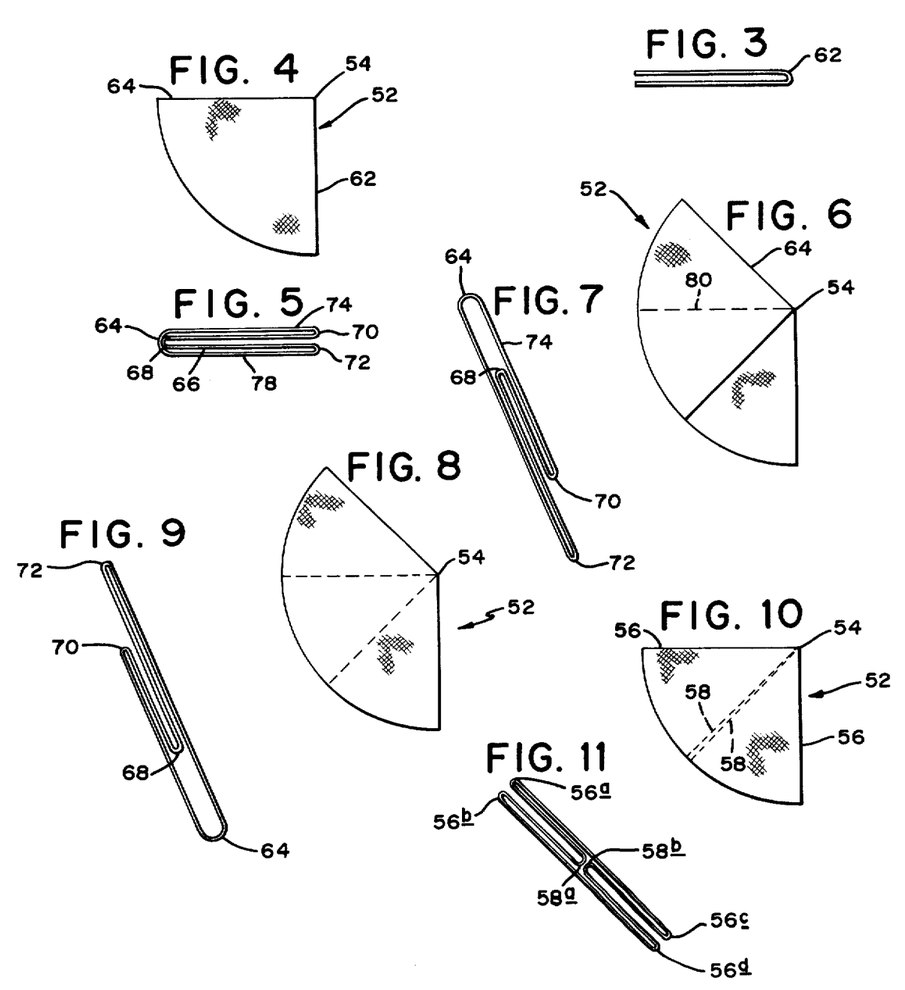
FIGS. 3, 5, 7, 9, 11, 13, 15, 17, 19, 21 and 23 are cross-sectional views, respectively, of FIGS. 2, 4, 6, 8, 10, 12, 14, 16, 18, 20 and 22.

In order to bring the steering wheel bag 52 shown in FIG. 1 into the configuration of the primary embodiment shown in FIGS. 24–25, or into the configuration of the secondary embodiment shown in FIGS. 28–29, the steering wheel bag 52 should preferably be folded in the manner illustrated in FIGS. 2–23. Referring to FIG. 1, the steering wheel bag 52 is folded in half to produce the configuration shown in FIGS. 2 and 3. In the configuration shown in FIGS. 2 and 3, the steering wheel bag 52 has a step #1 fold 62 along a diameter of the bag 52. The steering wheel bag 52 of FIGS. 2 and 3 is then folded in half again along a radius of the bag 52 approximately perpendicular to the step #1 fold 62 to bring the steering wheel bag 52 from the configuration shown in FIGS. 2 and 3 to the configuration shown in FIGS. 4 and 5. In the configuration shown in FIGS. 4 and 5, the steering wheel bag 52 has a step #2 fold 64 and a step #1 fold 62. In the configuration shown in FIGS. 4 and 5, the steering wheel bag 52 has an inside pleat 68 having a lower side 66. The steering wheel bag 52 also has an upper outside pleat 70 and a lower outside pleat 72. The upper outside pleat has an upper side 74. The lower outside pleat 72 has a lower side 78.

FIGS. 6 and 7 illustrate intermediate steps to produce the first-pleat-folds 56a and 56b shown on the left side of FIGS. 10 and 11, and the between-first-pleat-fold 58a. FIGS. 8 and 9 illustrate intermediate steps to produce the first-pleat-folds 56c and 56d on the right side of FIGS. 10 and 11 and the between-first-pleat-fold 58b.

To proceed from FIGS. 4 and 5 to FIGS. 6 and 7, the inside pleat 68 is moved to the right toward upper outside pleat 70. The lower side 66 of inside pleat 68 is moved under upper outside pleat 70 and lower outside pleat fold 72 is moved to the right. Referring to the configuration of the steering wheel safety bag in FIGS. 6 and 7, a step #3 fold 80 is made on the upper side 74, thereby bringing the upper outside pleat fold 70 over and on to the step #2 fold 64. As a result, step #2 fold 64 in FIGS. 6 and 7 becomes first-pleat-fold 56d in FIG. 10. Upper outside pleat fold 70 in FIGS. 6 and 7 becomes first-pleat-fold 56a in FIGS. 10 and 11. Step #3 fold 80 in FIGS. 6 and 7 becomes between-first-pleat-fold 58a in FIGS. 10 and 11.

FIG. 9 shows an inverted arrangement of the steering wheel safety bag 52 shown in FIG. 7. To proceed from the configuration of the steering wheel safety bag 52 shown in FIGS. 4 and 5 to the configuration shown at the right side of FIGS. 10 and 11, having two first-pleat-folds 56c and 56d and the between-first-pleat-fold 58b, one may use the same folding technique as explained for FIGS. 6 and 7.

FIGS. 12–23 illustrate steps for bringing the steering wheel safety bag 52 from the configuration shown in FIGS. 10 and 11 to the configuration shown in FIGS. 24 and 25 by increasing the number of first-pleat-folds 56 and between-first-pleat-folds 58. For example, FIGS. 12–23 illustrate how to increase the number of folds from the two such first-pleat-folds 56a and 56b on the left side of FIGS. 10 and 11 and the two such first-pleat-folds 56c and 56d on the right side of FIGS. 10 and 11 to the four such first-pleat-folds 56 on the left side of FIGS. 24 and 25 and the four such first-pleat-folds 56 on the right side of FIGS. 24 and 25. As a result, the configuration has a total of eight such first-pleat-folds 56.

Figures 12, 13, 14, 15, 16, 17, 18, 19:
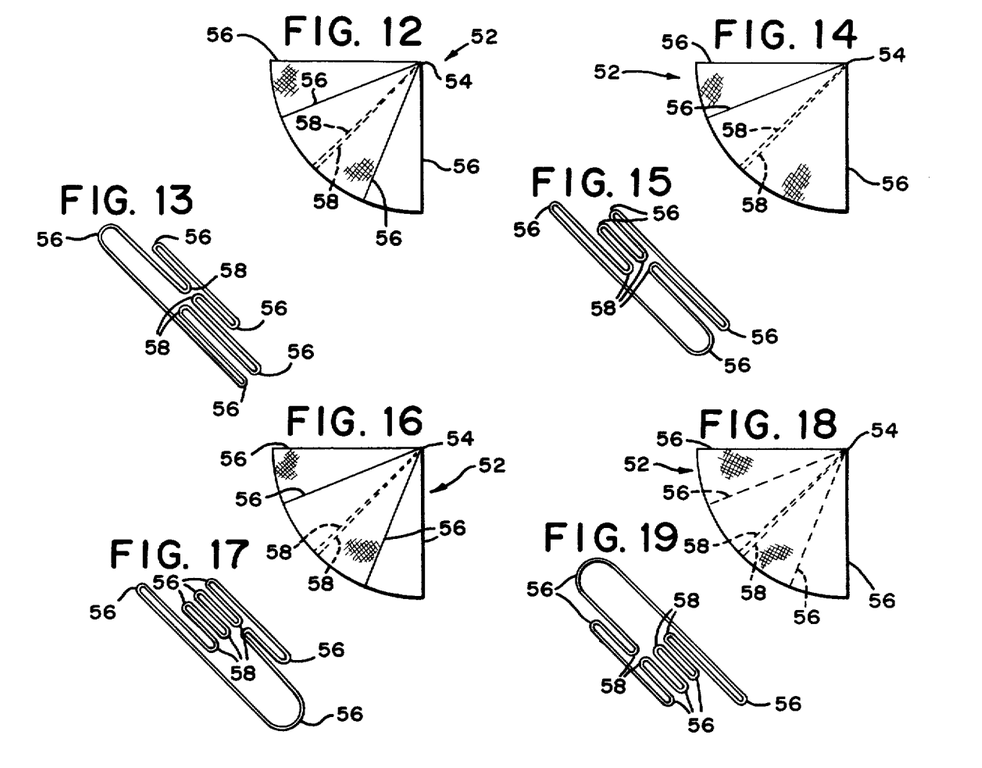

As another example, FIGS. 12 and 13 illustrate how to increase the number of first-pleat-folds 56 on the right side from two to three. The number of between-first-pleat-folds 58 is increased from one to two. FIGS. 14 and 15 illustrate how to increase the number of first-pleat-folds 56 on the left side of FIGS. 10 and 11 from two to three. The number of between-first-pleat-folds 58 is increased from one to two. Similarly, FIGS. 16–23 illustrate how to increase the number of first-pleat-folds 56 on each side from three to four.

In order to produce the steering wheel safety bag 52 of the second embodiment, illustrated in FIGS. 28 and 29, the number of folds illustrated in the configuration of the primary embodiment shown in FIGS. 24 and 25 is doubled. The secondary embodiment of FIGS. 28 and 29 has a total of sixteen first-pleat-folds 56, instead of a total of eight first-pleat-folds 56 as shown in the primary embodiment of FIGS. 24 and 25.

The superior deployment characteristics of the steering wheel safety bag 52 of this invention are evidenced in tests which showed that the horizontal extension of the bag during inflation is approximately two feet, as compared to an approximately two and one-half feet for prior art safety bags. Such bag extension is measured from the storage position of the bag when in deflated condition to the edge of the bag nearest the driver when in inflated condition. The reduced bag extension reflects reduced impact upon the driver.

PASSENGER SAFETY BAG

Figure 30:
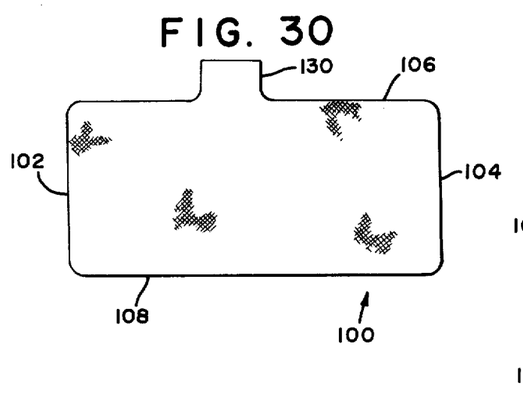
FIG. 30 is a schematic illustration of a passenger safety bag when in deflated, flattened, unfolded condition.

Referring to FIG. 30, when in deflated, flattened, unfolded condition, the passenger safety bag, referred to generally by the numeral 100, has a first side 102, a second side 104, a third side 106, and a fourth side 108. The first side 102 and the second side 104 are substantially parallel to one another. The third side 106 and the fourth side 108 are substantially parallel to one another. The third side 106 and the fourth side 108 are substantially perpendicular to the first side 102 and the second side 104, with optional rounded corners. As a result, the passenger safety bag 100 in such condition has a substantially rectangular configuration or a substantially square configuration.

Figure 31:
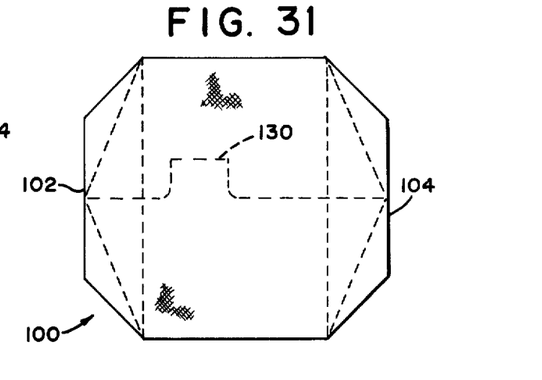
FIGS. 31, 33, 35, 37 and 41 are schematic illustrations of the passenger bag of FIG. 30 in intermediate configurations showing steps in folding the passenger bag.
Figure 32:
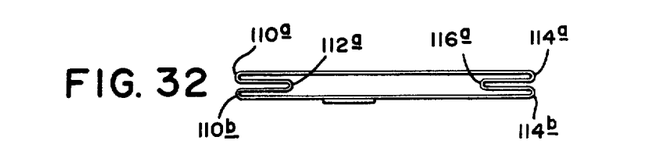
FIGS. 32, 34, 36, 38 and 42 are cross-sectional views or partial cross-sectional views respectively, of FIGS. 31, 33, 35, 37 and 41.
Figures 38, 40, 41, 42, 43, 44, 45:
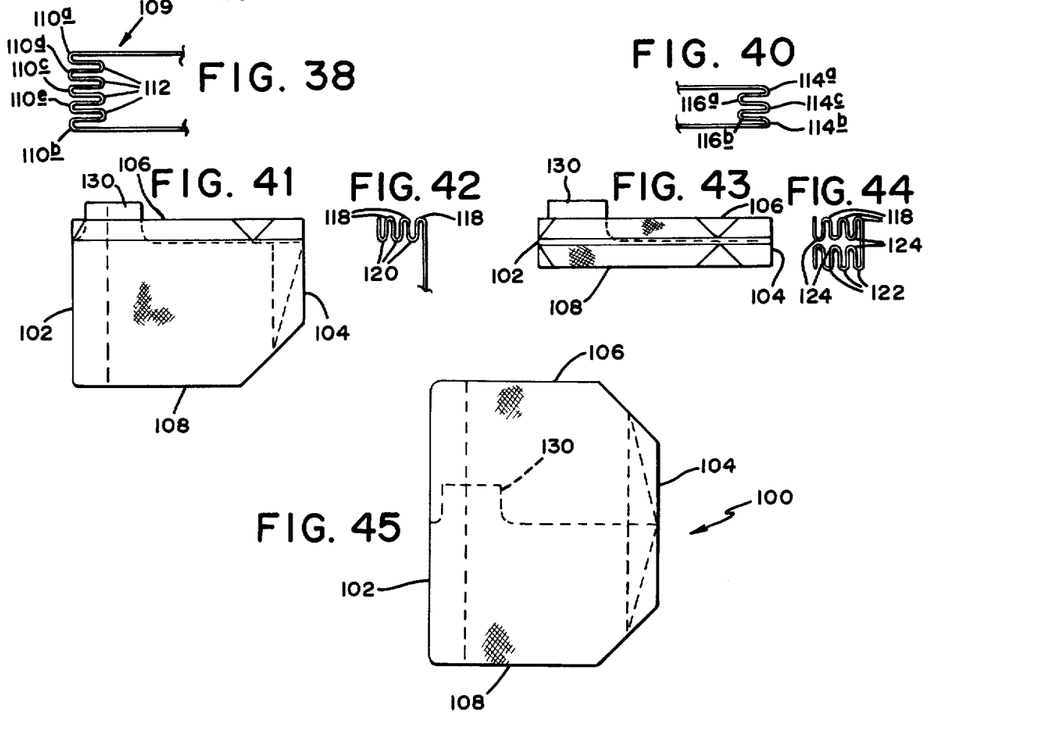
FIG. 40 is a partial cross-sectional view of FIG. 39.
FIG. 43 is a schematic illustration of the steering wheel bag of this invention in its final storage configuration prior to inflation of the bag.
FIG. 44 is a partial cross-sectional view of FIG. 43.
FIG. 45 is a schematic illustration of a secondary embodiment of an intermediate configuration of the passenger bag of FIG. 30.
Figure 46:
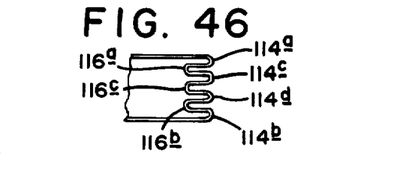
FIG. 46 is a partial cross-sectional view of FIG. 45.

FIGS. 31 and 32 illustrate a primary embodiment showing the folds at the second side 104 of the passenger safety bag 100 prior to the final storage configuration shown in FIGS. 43 and 44. FIGS. 45 and 46 illustrate an alternate and secondary embodiment showing the folds at the second side 104 of the passenger safety bag 100 prior to the final storage configuration shown in FIGS. 43 and 44.

Figure 37:
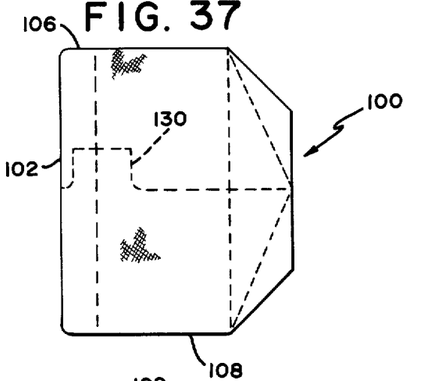

Referring to FIGS. 37-44, the passenger safety bag 100 has a plurality of first-pleats, referred to generally by the numeral 109 in FIG. 37; each first pleat 109 having a first-pleat-fold 110; a plurality of between-first-pleat-folds 112; and a plurality of cross-pleat-folds. One between-first-pleat-fold 112 is disposed between adjacent first-pleats 109. The plurality of cross-pleat-folds are disposed substantially transverse to the first-pleats 109, the first-pleat-folds 110 and the between-first-pleat-folds 112.

Figure 39:
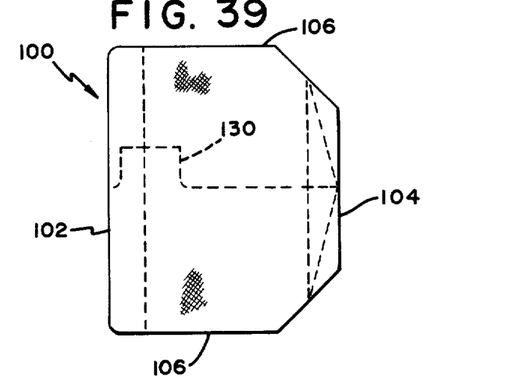
FIG. 39 is a schematic illustration of a primary embodiment of an intermediate configuration of the passenger bag of FIG. 30.

Referring to FIGS. 37 and 38, the first-pleat-folds 110 and the between-first-pleat-folds 112 are each disposed substantially parallel to one another and adjacent and substantially parallel to the first side 102. Referring to FIGS. 39 and 40, the passenger safety bag 100 further includes a plurality of second-pleats, each second-pleat havin a second-pleat-fold 114. The passenger safety bag 100 further includes a plurality of between-second-pleat-folds 116, one between-second-pleat-fold 116 disposed between adjacent second-pleats. The second-pleat-folds 114 and the between-second-pleat-folds 116 disposed substantially parallel to one another and adjacent and substantially parallel to the second side 104.

The plurality of cross-pleat-folds includes a plurality of first-cross-pleats and a plurality of second-cross-pleats. Referring to FIGS. 41 and 42, a plurality of first-cross-pleat-folds 118 are disposed adjacent and substantially parallel to the third side 106 of the passenger safety bag 100. A plurality of between-first-cross-pleat-folds 120 are disposed adjacent and substantially parallel to the third side 106 of the passenger safety bag 100. The plurality of first-cross-pleat-folds 118 and a plurality of between-first-cross-pleat-folds 120 form a plurality of first-cross-pleats. One betwee-first-cross-pleat-fold 120 is disposed between each first-cross-pleat.

Referring to FIGS. 43 and 44, a pluraliy of second-cross-pleat-folds 122 are disposed adjacent and substantially parallel to the fourth side 108 of the passenger safety bag 100. A plurality of between-second-cross-pleat-folds 124 are disposed adjacent and substantially parallel to the fourth side 108 of the passenger safety bag 100. The plurality of second-cross-pleat-folds 122 and the plurality of between-second-cross-pleat-folds 124 form a plurality of second-cross-pleats. One between-second-cross-pleat-fold 122 is disposed between each second-cross-pleat. The first-cross-pleats and the second-cross-pleats are arranged approximately transverse and approximately perpendicular to the first-pleats and the second-pleats.

Referring to FIGS. 37-44, the passenger safety bag 100 has: from four to eight such first-pleats; from two to six such second-pleats; from two to six such first-cross-pleats; and from two to six such second-cross-pleats. This means that the passenger safety bag 100 has: from four to eight such first-pleat-folds 110; from three to seven such between-first-pleat-folds 112; from two to six such second-pleat-folds 114; from one to five between-second-pleat-folds 116; from two to six such first-cross-pleat-folds 118; from two to six between-first-cross-pleat-folds 120; from two to six such second-cross-pleat-folds 122; and from two to six such between-second-cross-pleat-folds 124. The primary embodiment of the passenger safety bag 100 has: five such first-pleat-folds 110 (FIGS. 37-38); four such between-first-pleat-folds 112 (FIGS. 37-38); three such second-pleat-folds 114 (FIGS. 39-40); two such between-second-pleat-folds 116 (FIGS. 39-40); three such first-cross-pleat-folds 118 (FIGS. 41-42); and three such between-first-cross-pleat-folds 120 (FIGS. 41-42); three such second-cross-pleat-folds 122 (FIGS. 43-44); and three such between-second-cross-pleat-folds 124 (FIGS. 43-44). As a result, the primary embodiment of the passenger safety bag 100 has: five such first-pleats; four such second-pleats; three such first-cross-pleats; and three such second-cross-pleats.

Referring to FIGS. 37-38 and 41-46, the secondary embodiment of the passenger safety bag 100 has: five such first-pleat-folds 110 (FIGS. 37-38); four such between-first-pleat-folds 112 (FIGS. 37-38); four such second-pleat-folds 114 (FIGS. 45-46); three such between-second-pleat-folds 116 (FIGS. 45-46); three such first-cross-pleat-folds 118 (FIGS. 41-42); three such between-first-cross-pleat-folds 120 (FIGS. 41-42); three such second-cross-pleat-folds 122 (FIGS. 43-44); and three such between-second-cross-pleat-folds 124 (FIGS. 43-44). As a result, the secondary embodiment of the passenger safety bag has five such first-pleats; four such second-pleats; three such first-cross-pleats and three such second-cross-pleats. The difference between the secondary embodiment and the primary embodiment of the passenger safety bag is in the number of the second-pleats. Referring to FIGS. 45-46, the secondary embodiment has four such second-pleats, whereas the primary embodiment has three such second-pleats, as shown in FIGS. 39-40. This means that the secondary embodiment has four such second-pleats 114 and three such between-second-pleat-folds 116, as shown in FIGS. 45-46; whereas the primary embodiment has three such second-pleat-folds 114 and two such between-second-pleat-folds 116, as shown in FIGS. 39-40.

In order to bring the passenger safety bag 100 shown in FIG. 30 into the configuration shown in FIGS. 43-44, the passenger safety bag 100 should preferably be folded in the manner illustrated in FIGS. 31-42.

Referring to FIG. 30, the passenger safety bag 100 has a neck 130 adapted to be connected to an inflation means (not shown). Referring to FIGS. 31-32, the passenger safety bag 100 has been rearranged so that the neck 130 is on the bottom side of the passenger safety bag 100. Folds are made in the first side 102 of the passenger safety bag 100 and in the second side 104 of the passenger safety bag 100 to bring the passenger safety bag 100 into the configuration shown in FIGS. 31-32. The passenger safety bag 100 in the configuration shown in FIGS. 31-32 has two step #1 pleat-folds 110a and 110b and one step #1 between-pleat-fold 112a adjacent and substantially parallel to the first side 102 of the passenger safety bag 100. Similarly, at the second side 104 shown in FIGS. 31-32, the passenger safety bag 100 has two step #2 pleats 114a and 114b and one step #2 between-pleat-fold 116a adjacent and substantially parallel to the second side 104.

Figure 33:
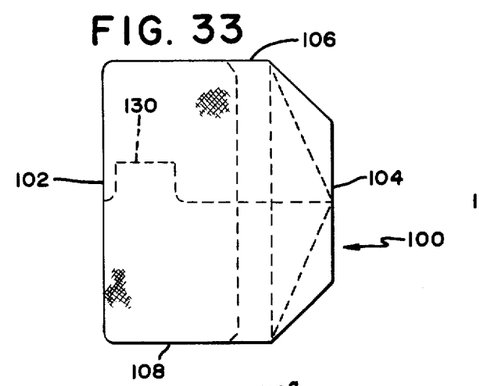
Figure 34:
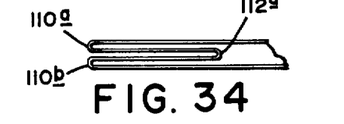

To bring the first side 102 of the passenger safety bag 100 from the configuration shown in FIGS. 31-32 to the configuration shown in FIGS. 33-34, the step #1 between-pleat-fold 112a adjacent to the first side 102 is extended deeper into the passenger safety bag 100 in the direction toward the second side 104 of the bag. To bring the first side 102 of the passenger safety bag 100 from the configuration shown in FIGS. 33-34, to the configuration shown in FIGS. 35-36, a step #3 pleat-fold 110c is made between the two step #1 plet-folds 110a and 110b. A step #3 between-pleat-fold 112b is made below the between-pleat-fold 112a.

Figure 35:
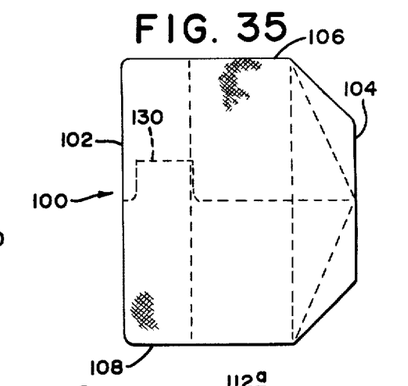
Figure 36:
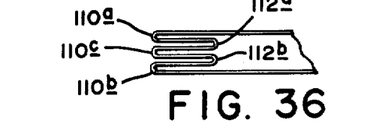

To bring the first side 102 of the passenger safety bag 100 from the configuration shown in FIGS. 35-36, to the configuration shown in FIGS. 37-38, two step #4 pleat-folds 110d and 110e are added adjacent and substantially parallel to the first side 102 of the passenger safety bag 100. Referring to FIGS. 37-38, the result is that the passenger safety bag 100 has two step #1 pleat-folds 110a and 110b, one step #3 pleat-fold 110c, and two step #4 pleat-folds 110d and 110e.

To bring the second side 104 of the passenger safety bag 100 from the configuration shown in FIGS. 31-32 to the configuration shown in the primary embodiment of FIGS. 39-40, a step #5 pleat-fold 114c is made adjacent and substantially parallel to the second side 104 of the passenger safety bag 100 between the two step #2 pleat-folds 114a and 114b. A step #5 between-pleat-fold 116b is also made below the between-pleat-fold 116a.

For the secondary embodiment of the passenger bag 100 shown in FIGS. 45-46, an additional second-pleat-fold 114d and an additional between-second-pleat-fold 116c are made.

To bring the third side 106 of the passenger bag 100 from the configuration shown in FIG. 30 to the configuration shown in FIG. 42, three first-cross-pleat-folds 118 and three between-first-cross-pleat-folds 120 are made in the third side 106. Similarly, to bring the fourth side 108 of the passenger safety bag 100 from the configuration shown in FIG. 30 to the configuration shown in FIGS. 43 and 44, three second-cross-pleat-folds 122 and three between-second-cross-pleat-folds 124 are made in the fourth side 108.

It has been discovered that vehicle safety bags of this invention, folded in the manner disclosed herein, inflate and deploy with far more desirable characteristics than vehicle safety bags folded by prior art techniques such as the "bubble roll", and the "accordion fold". Deployment refers to the unfolding of the safety bag during inflation by a gas during an emergency situation, such as collision, and the movement of the inflating safety bag against the occupant. The superior performance of the vehicle safety bags of this invention is particularly important in reference to a child standing by the dashboard in front of the front seat of a vehicle. However, vehicle safety bags of this invention also have superior performance characteristics in reference to adults seated in the vehicle. The following test results illustrate the superior deployment characteristics of the primary embodiment of the passenger safety bag 100 of this invention in Tests 1-3 and 11 in reference to a standing child, as compared to the same vehicle safety bags having prior art folds in Tests 4-10.

| Test No. | Vehicle Safety Bag Fabric-Type of Folding | Approx. Fill Time | Head SI | Chest SI | (3) ms Chest gs |
|---|---|---|---|---|---|
| 1 | Standard Material & Invention Folds | 60ms | 190 | 30 | 18 |
| 2 | Standard Material & Invention Folds | 60ms | 462 | 162 | 35 |
| 3 | Standard Material & Invention Folds | 60ms | 257 | 712 | 75 |
| 4 | Standard Material & Standard Prior Art Fold | 60ms | 1637 | 408 | 65 |
| 5 | Standard Material & Bubble Roll | 60ms | 1073 | 743 | 94 |
| 6 | Standard Material & Accordion Fold | 60ms | 461 | 1088 | 92 |
| 7 | Heavy Material & Bubble Roll | 60ms | 3370 | 766 | 95 |
| 8 | Heavy Material & Bubble Roll | 60ms | 576 | 1390 | 98 |
| 9 | Light Material & Bubble Roll (Bag Failed) | — | 421 | 406 | 47 |
| 10 | Light Material & Bubble Roll | 60ms | 37 | 120 | 38 |
| 11 | Light Material & Invention Folds | 60ms | 114 | 156 | 45 |

The foregoing data was obtained by use of triaxial accelerometers placed in dummies representing a child standing by the dashboard in front of the right front passenger seat of an automobile during a crash. The vehicle safety bags were mounted in a high position, that is, in the dashboard on the right front passenger side. The test results are expressed in terms of Severity Index (SI) and in terms of Acceleration (gs) during three milliseconds (ms).

Severity Index (SI) is an indication of injury potential to the occupant of the vehicle, in this case, a standing child. Severity Index is proportional to the equation:

$$SI = \int a^n dt$$

where:
SI = Severity Index
a = acceleration (force of pressure)
n = weighting factor greater than 1
t = time The Severity Index is a recognized measurement of injury potential and is explained in a Report of Body Engineering and Automotive Safety Committees of SAE entitled "Human Tolerance to Impact Conditions as Related to Motor Vehicle Design-SAEJ885a" page 947.

The foregoing test results show the Severity Index at the head of the dummy and at the chest of the dummy. The foregoing test results also show acceleration on the chest of the dummy during a three millisecond period of time during deployment of the vehicle safety bag. To be acceptable, the Severity Index measurements should be below 1000 and the lower the better. The acceleration measurements should be below 60 and the lower the better. Tests 1-6 used a vehicle safety bag made of a standard material which was a medium weight material having a weight of 7.4 ounces per square yard. Tests 7 and 8 used a heavy weight material of 14 ounces per square yard. Tests 9-11 used a light weight material having a weight of 4.86 ounces per yard. The light weight material was found to be unsatisfactory because in test 9 the vehicle safety bag failed.

Referring to tests 1-3, the passenger safety bag having the folds of the invention produced lower head Severity Index results than the vehicle safety bags in tests 4 and 5 using prior art folds. Similarly, the chest Severity Index for tests 1-3 is lower for the vehicle safety bag having folds of this invention than the Severity Index for comparable vehicle safety bags in tests 4-6 using prior art folds. Similarly, the measurements of chest acceleration in tests 1-3 are generally lower than the test results in 4-6. Tests 7 and 8 are discounted because the heavy bag material yielded unacceptably high accelerometer loads. Tests 9-11 are discounted because the marginal strength of the light weight bag was considered to be unacceptable.

The foregoing test results show that the specially folded passenger safety bag of this invention reduced the impact of the bag on a standing child. Such a specially folded passenger safety bag of this invention produces similar results in reference to an adult seated in the right front passenger seat or in a rear seat of the automobile. Likewise, similar results can be expected in reference to the specially folded steering wheel safety bag of this invention.

We claim:

1. A safety bag adapted to be inflated in a vehicle to cushion a passenger of the vehicle, said safety bag having a deflated, folded condition and an inflated, unfolded condition, said bag when in deflated, folded condition comprising:
   a first side, a second side, a third side and a fourth side, said first side and said second side being substantially parallel to one another, said third side and said fourth side being substantially parallel to one another and substantially perpendicular to said first and second sides;
   five first-pleat-folds and four between-first-pleat-folds disposed substantially parallel to one another and adjacent and substantially parallel to said first side, one said between-first-pleat-fold being disposed between adjacent first-pleat-folds, thereby forming four first-pleats;
   three second-pleat-folds and two between-second-pleat-folds disposed substantially parallel to one another and adjacent and substantially parallel to said second side, one said between-second-pleat-fold being disposed between adjacent second-pleat-folds, thereby forming three second-pleats;
   three first-cross-pleat-folds and three between-first-cross-pleat-folds disposed adjacent and substantially parallel to said third side of said bag and forming three first-cross-pleats; and
   three second-cross-pleat-folds and three between-second-cross-pleat-folds disposed adjacent and substantially parallel to said fourth side of said bag and forming three second-cross-pleats, said first-cross-pleats and said second-cross-pleats being arranged substantially transverse to said first-pleats and said second-pleats, at least one of said cross-pleat-folds intersecting at least one of said first-pleat-folds whereby said bag inflates with reduced impact on the occupant.

2. A safety bag adapted to be inflated in a vehicle to cushion a passenger of the vehicle, said safety bag having a deflated, folded condition and an inflated, unfolded condition, said bag when in deflated, folded condition comprising:
   a first side, a second side, a third side and a fourth side, said first side and said second side being substantially parallel to one another, said third side and said fourth side being substantially parallel to one another and substantially perpendicular to said first and second sides;
   five first-pleat-folds and four between-first-pleat-folds disposed substantially parallel to one another and adjacent and substantially parallel to said first side, one said between-first-pleat-fold being disposed between adjacent first-pleat-folds, thereby forming four first-pleats;
   four second-pleat-folds and three between-second-pleat-folds disposed substantially parallel to one another and adjacent and substantially parallel to said second side, one said between-second-pleat-fold being disposed between adjacent second-pleat-folds, thereby forming three second pleats;
   three first-cross-pleat-folds and three between-first-cross-pleat-folds disposed adjacent and substantially parallel to said third side of said bag and forming three first-cross-pleats; and
   three second-cross-pleat-folds and three between-second-cross-pleat-folds disposed adjacent and substantially parallel to said fourth side of said bag and forming three second-cross-pleats, said first-cross-pleats and said second-cross-pleats and said second-pleats, at least one of said cross-pleat-folds intersecting at least one of said first-pleat-folds, whereby said bag inflates with reduced impact on the occupant.

* * * * *